United States Patent
Crowell

[19]

[11] Patent Number: 5,857,695
[45] Date of Patent: Jan. 12, 1999

[54] BEACH CART

[76] Inventor: Stacey Lee Crowell, 55 Cottage St., Newton, Mass. 02164

[21] Appl. No.: 843,879

[22] Filed: Apr. 17, 1997

Related U.S. Application Data

[63] Continuation-in-part of Ser. No. 402,891, Mar. 13, 1995, abandoned, which is a continuation-in-part of Ser. No. 119,663, Sep. 13, 1993, abandoned.

[51] Int. Cl.⁶ .................................................... B62B 3/02
[52] U.S. Cl. ...................... 280/651; 280/30; 280/47.11; 280/47.35; 280/47.371
[58] Field of Search ................................ 280/30, 37, 651, 280/656, 87.01, 47.11, 47.38, 47.39, 79.4, 79.2, 47.35, 47.371

[56] References Cited

U.S. PATENT DOCUMENTS

| | | | |
|---|---|---|---|
| D. 269,335 | 6/1983 | Eubanks | 280/47.31 |
| 2,604,333 | 7/1952 | Elmer | 280/37 |
| 2,688,493 | 9/1954 | Rosenberg | 280/651 |
| 2,967,058 | 1/1961 | Hoffmann | 280/47.31 |
| 3,236,539 | 2/1966 | Ketterer | 280/87.01 |
| 3,318,612 | 5/1967 | Kuhn | 280/87.01 |
| 3,677,571 | 7/1972 | Maturo, Jr. | 280/36 R |
| 3,679,227 | 7/1972 | Rock | 280/47.24 |
| 3,826,511 | 7/1974 | Frank | 280/36 R |
| 4,145,064 | 3/1979 | Carn | 280/87.01 |
| 4,199,170 | 4/1980 | Hubner et al. | 280/651 |
| 4,362,308 | 12/1982 | Hicks et al. | 280/30 |
| 4,735,426 | 4/1988 | McConnell | 280/47.38 |
| 4,796,909 | 1/1989 | Kirkendall | 280/651 |
| 4,856,810 | 8/1989 | Smith | 280/37 |
| 4,878,682 | 11/1989 | Lee | 280/651 |
| 4,887,836 | 12/1989 | Simjian | 280/651 |
| 4,930,831 | 6/1990 | Valiga et al. | 280/47.34 |
| 5,186,479 | 2/1993 | Flowers | 280/651 |
| 5,197,754 | 3/1993 | Ward | 280/47.26 |
| 5,201,536 | 4/1993 | Bono et al. | 280/37 |
| 5,285,656 | 2/1994 | Peters | 280/30 |
| 5,407,218 | 4/1995 | Jackson | 280/30 |
| 5,480,170 | 1/1996 | Kaiser | 280/30 |
| 5,529,323 | 6/1996 | Vom Braucke et al. | 280/87.01 |
| 5,653,458 | 8/1997 | Chaparian | 280/30 |

FOREIGN PATENT DOCUMENTS 912200  5/1954  Germany ................................ 280/651

Primary Examiner—Brian L. Johnson
Assistant Examiner—Avraham H. Lerner
Attorney, Agent, or Firm—Ronald R. Kilponen

[57] ABSTRACT

A collapsible caddy which coverts into a table when collapsed has wheels adapted to pavement and sand. The caddy optionally is provided with an umbrella support and attachment openings.

18 Claims, 12 Drawing Sheets

BEACH CART

FIELD OF THE INVENTION

This invention relates to collapsible carts.

This application is a continuation in part of U.S. patent application Ser. No. 08/402,891 filed Mar. 13, 1995 now abandoned, which was a continuation in part of Ser. No. 08/119,663 filed Sep. 13, 1993, now abandoned.

BACKGROUND OF THE INVENTION

People encounter difficulty when transporting personal belongings to and from recreational settings, particularly over soft surfaces like sand.

Such difficulties have been approached in a variety of ways. U.S. Pat. No. 3,679,227, incorporated herein by reference, shows a cart having a frame with paddle wheels, which may be disassembled for storage. However, parts can become separated during storage, and no support for small objects such as sunglasses is shown.

U.S. Pat. No. 3,677,571 shows a beach cart having a frame for a bag and a roller like wheel. The cart can extend into a beach chair.

U.S. Pat. No. 3,826,511 incorporated herein by reference shows a collapsible beach barrow in which a ball serves as a wheel.

SUMMARY OF THE INVENTION

It is an object of the invention to provide a practical and flexible means to transport personal belongings which is lightweight, folds for easy storage and transportability, is easily steered and maneuvered over a wide variety of surfaces, does not become disabled when used in sand, can be used a beach table, transports a wide variety of objects, and can support an umbrella.

The present caddy offers a quality product to those who want an easier and more organized way to transport belongings. The present caddy is particularly useful for recreational use at the beach, camping, picnics, outdoor concerts, and sporting events. Using the caddy, an individual or family will be able to move their gear with ease. By allowing people to enjoy recreational activities fully, this product helps use limited recreational time well.

A foldable plastic cart has ball wheels which are sealed from sand. The end panels form a beach table. The towing handle is retractable and front axle pivotably mounted.

DETAILED DESCRIPTION OF THE EMBODIMENTS

Figure 1:
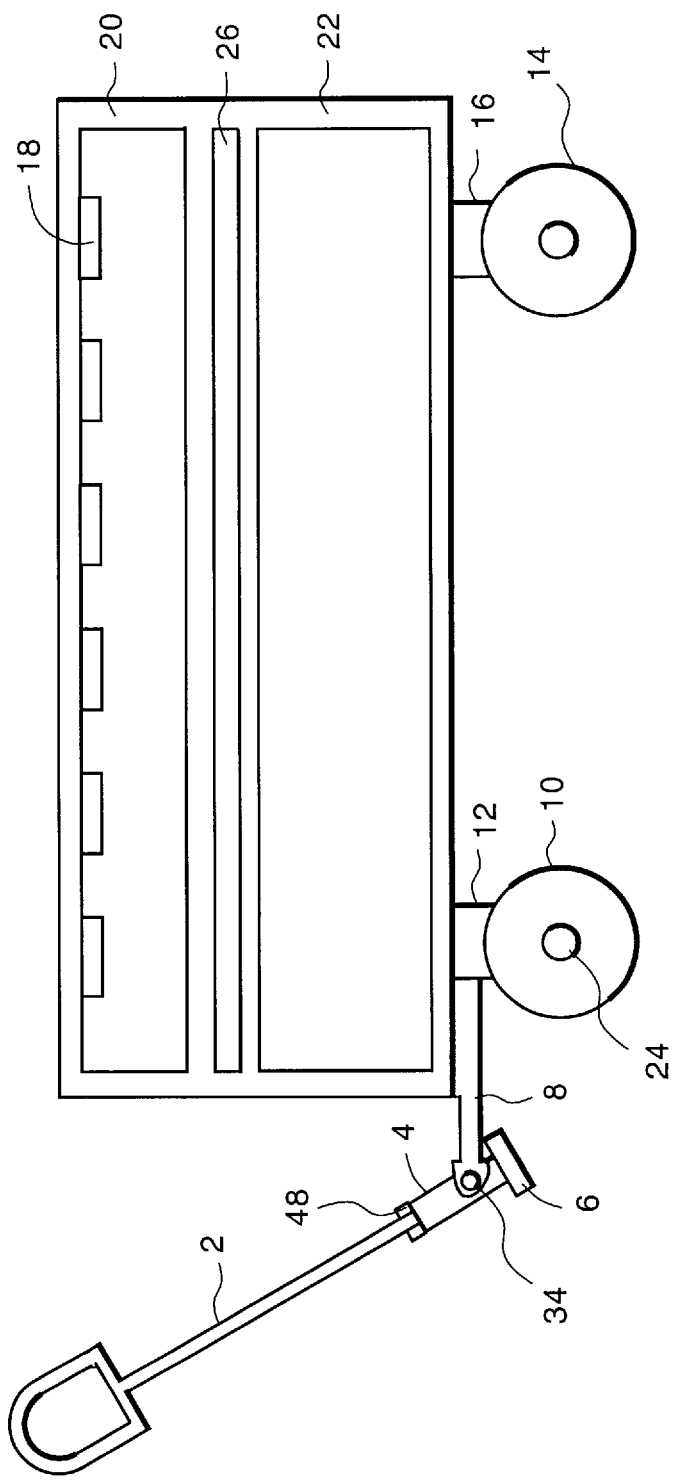
FIG. 1 is a side view of a beach cart according to the invention.
Figure 7A:
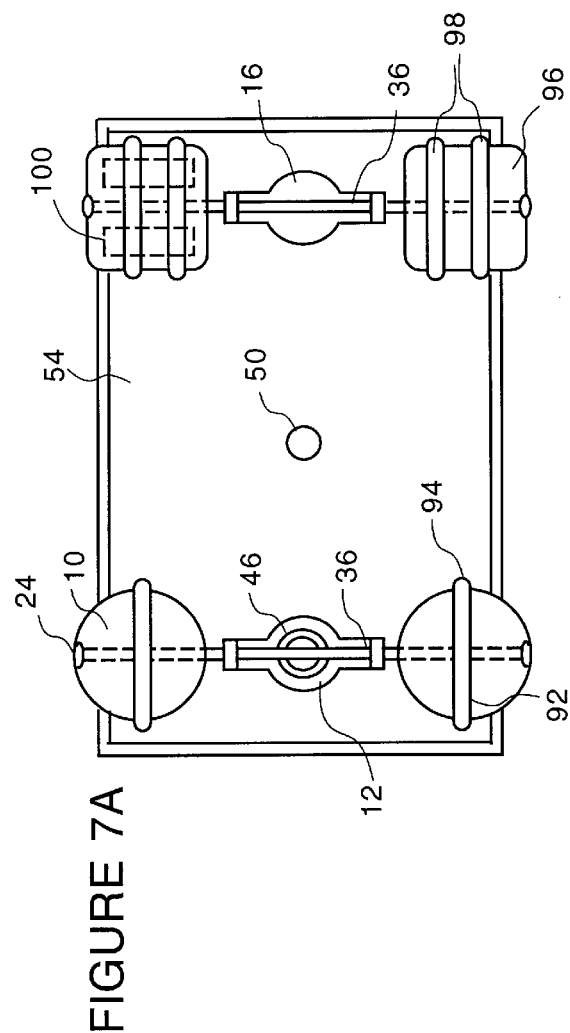
FIG. 7A is a base view of a cart according to the invention.
Figure 7B:
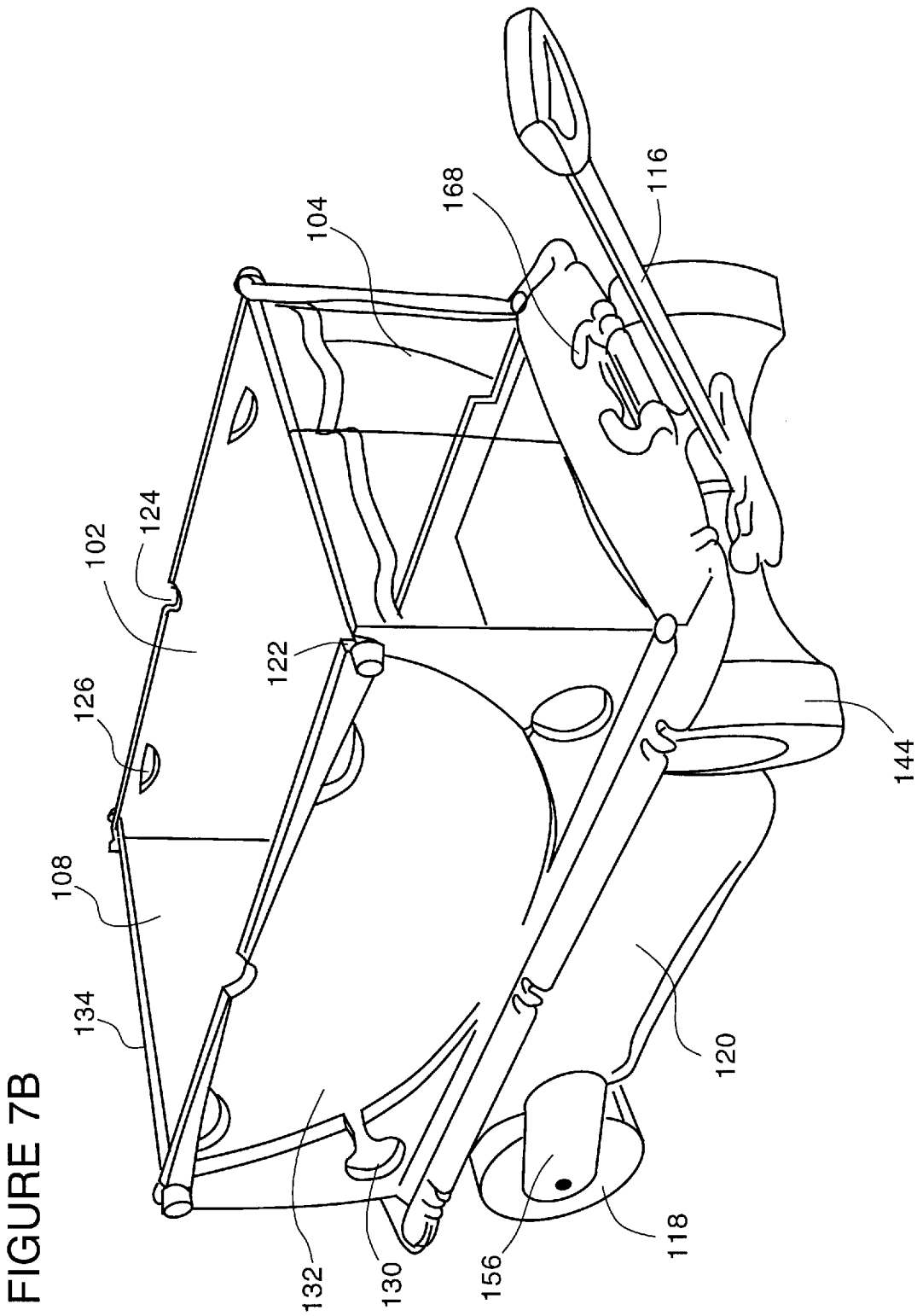
FIG. 7B is a perspective view of a cart according to the invention.

The cart of FIG. 1 has a tow handle (2) retained in an extended position in the handle sleeve (4) by an upper handle retainer (48). The shaft of the handle (2) is free to rotate in the sleeve (4). A lower handle retainer (6) prevents separation of the handle (2) when the cart is towed. The sleeve (4) is connected through a handle pivot (34) and handle pivot support (8) to the cart body. The side of the cart has upper (20) and lower (22) panels. The upper panel (20) has attachment apertures (18) and a slotted aperture (26) for attaching objects which do not readily fit in the body of the cart. Front and rear yokes (12, 16) connect the body with front and rear ball type wheels (10, 14). Each wheel (10) has an outer wheel cap (24). To provide a cart which is light weight for easy lifting and storage, durable, and easy to clean, the caddy can be manufactured from a somewhat rigid plastic incorporating a UV inhibitor. It is preferable however, to mold the cart base (54) and the rear yoke (16) in one piece. The ball type wheels (10, 14), being essentially spherical, touch a hard surface like pavement at a single point, the points forming a band or circumference which contact pavement minimally and reduce friction. If ball wheels are made of hard plastic which is noisy and transmits bumps, an heavy elastic band 94 as shown in FIG. 7A, can be located around the circumference, and a groove 92 provided to stabilize the position. On sand, tendency to sink is counteracted by surface area on the rest of the sphere. Other wheel types are possible, for example a barrel type wheel having raised ribs 98. A barrel type wheel 96 can also hold materials like soda cans 100 in ice, where wheel rotation would mix the ice with the cans.

Figure 2:
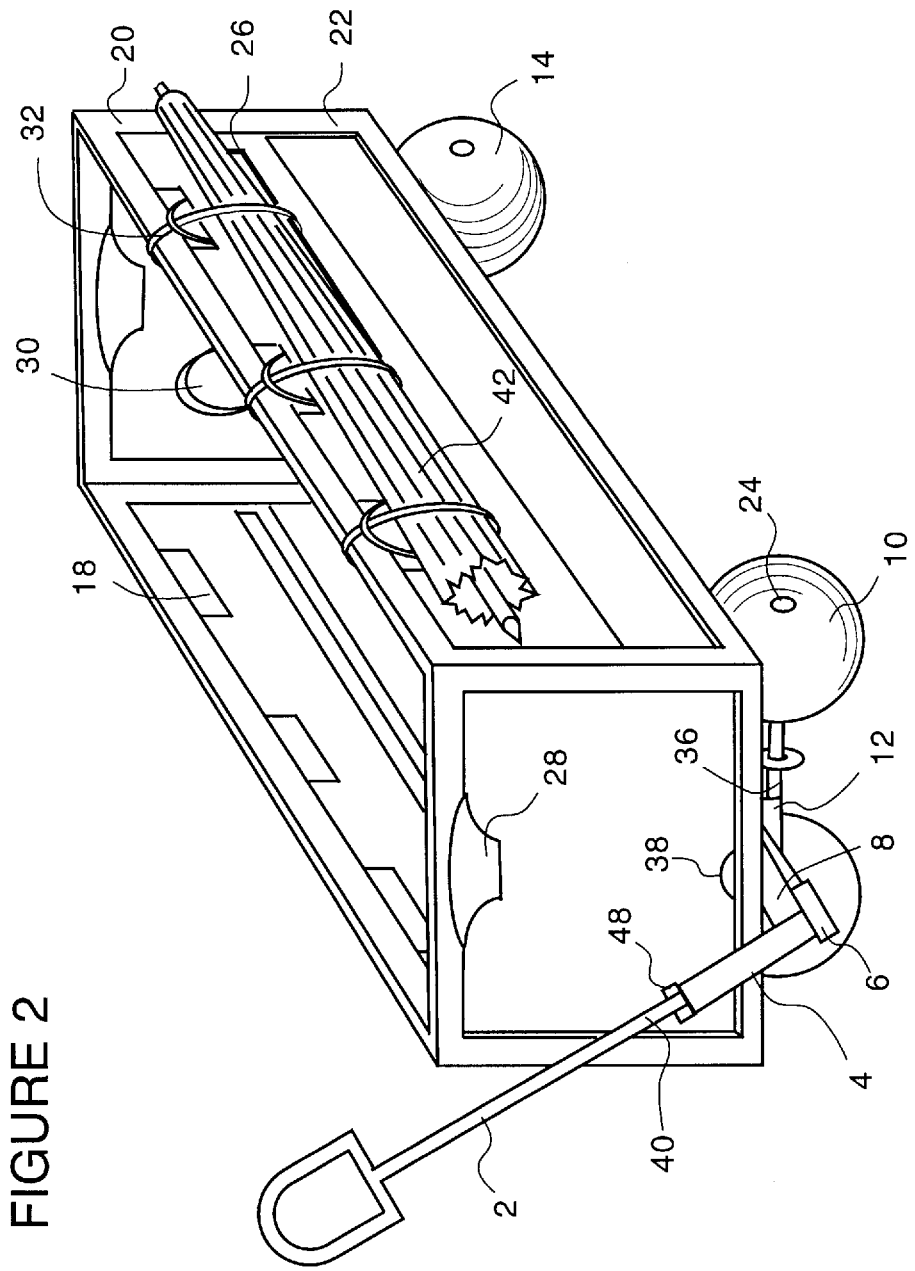
FIG. 2 is a perspective view of the beach cart during transport.

The cart in FIG. 2 has an umbrella (42) attached through apertures (18, 26) by straps (32). Such straps (32) can be tied or attached by hook and loop fasteners, by hooks such as "bungee" fasteners, or any commonly known fastener. Such straps allow additional items to be toted such as folding chairs or fishing rods. In place of or in addition to the straps, other fastening means such as projections, or hook and loop fasteners can be used. End panels (40) have handle apertures (28) and a split upper umbrella opening (38). When the cart is folded, the upper part of the handle apertures (28) provides a means for carrying or lifting the cart. Inner surfaces of the end panels (40) have recesses (30) for holding dishes or drinks. An axle (36) passes through the front yoke (12) into the wheels (10).

Figure 3A:
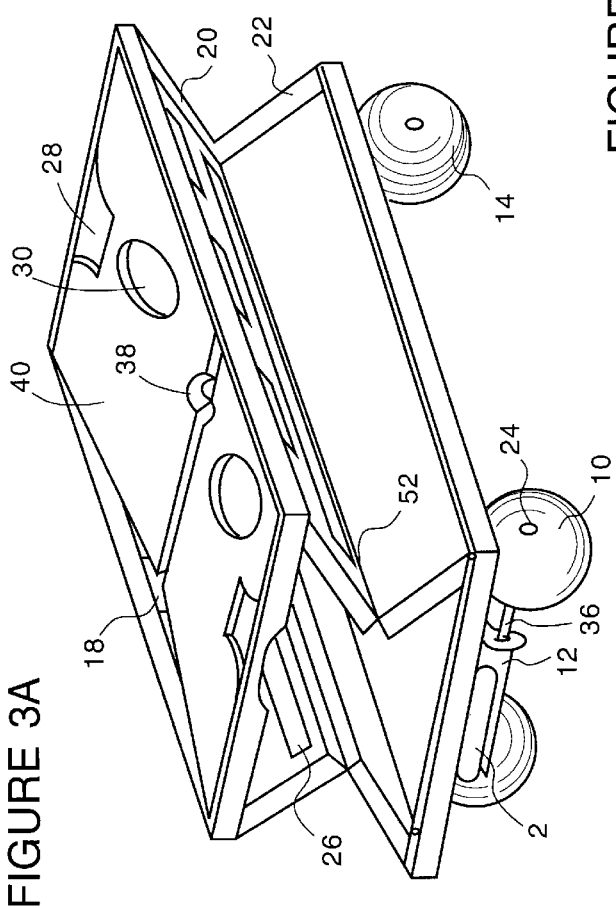
FIGS. 3A and B are perspective views of the cart showing conversion to a beach table.
Figure 3B:
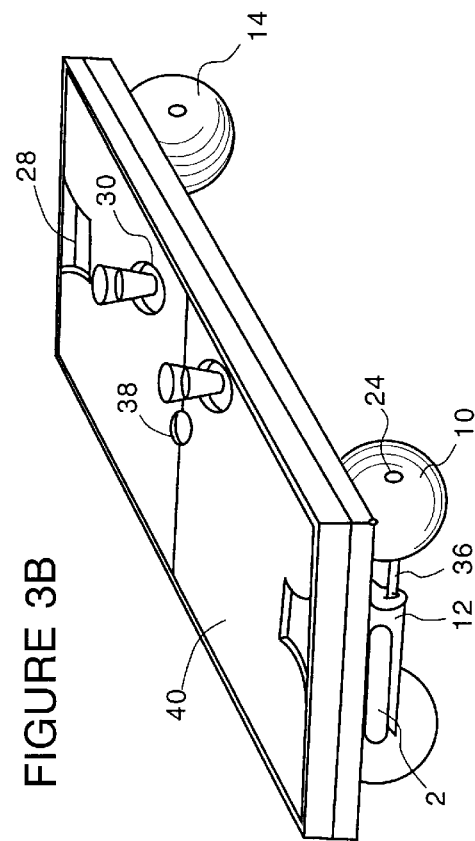

After the cart is unloaded, the handle (2) may be retracted, and the body folded as shown in FIG. 3A for use as a table shown in FIG. 3B. To fold the body, end panels (40) are swung upward and inward, and upper and lower (20, 22) side panels are folded inward along a side panel joint (52) so that the upper side (20) lies on the lower side (22). This allows the caddy to be folded in one movement. Panels may be hinged in any known way. When folded, beverages maybe secured in recesses (30), and if desired, an umbrella (42) may be inserted through upper (38) and lower (50) umbrella openings. The raised table minimizes the tendency for sand to get into food. The folded caddy can also be used as a flat bed cart to tow oversize items. Although end panels (40) are shown as swinging up and inward from a top support rim, it is possible to have panels which swing in and downward. To prevent unexpected unfolding of the caddy, a securing means such as a short strap with a snap fastener can hold upper and lower support rims together.

Figure 4A:
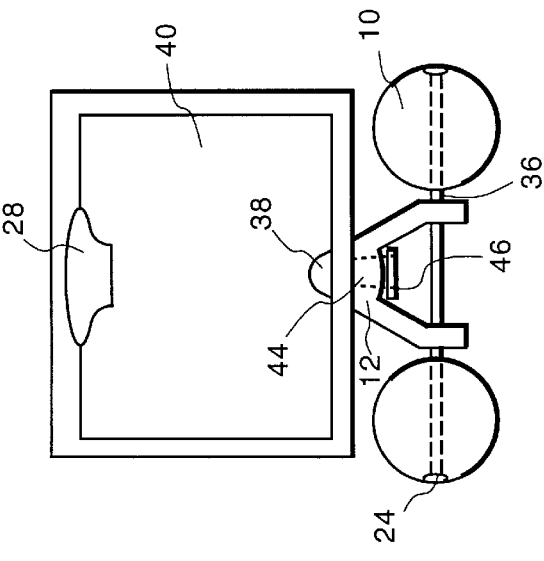
FIGS. 4A to C are rear, front, and base views of a cart.
Figure 4B:
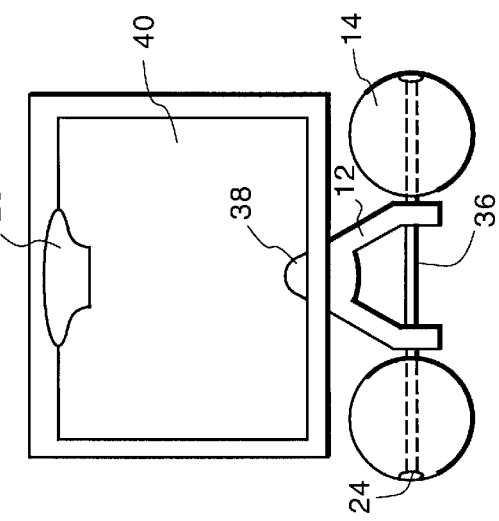
Figure 4C:
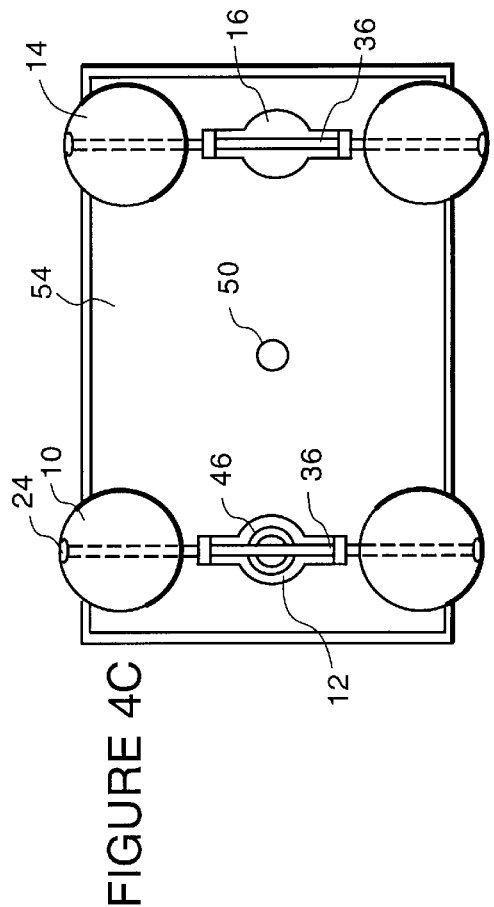

The cart is shown in FIG. 4 without a handle, to better visualize the wheel assembly. The yoke (12) is attached in a stationary position to the base panel (54). Alternatively the yoke and and base panel can be molded as one piece, i.e. integral. A lower umbrella opening (50) is located between the front and rear wheel assemblies. For steering easier, the front yoke (12) is mounted on a front yoke pivot (44) and secured by a retainer (46). When the handle (2) is retracted, it lies on top of the axles (36).

Figure 5A:
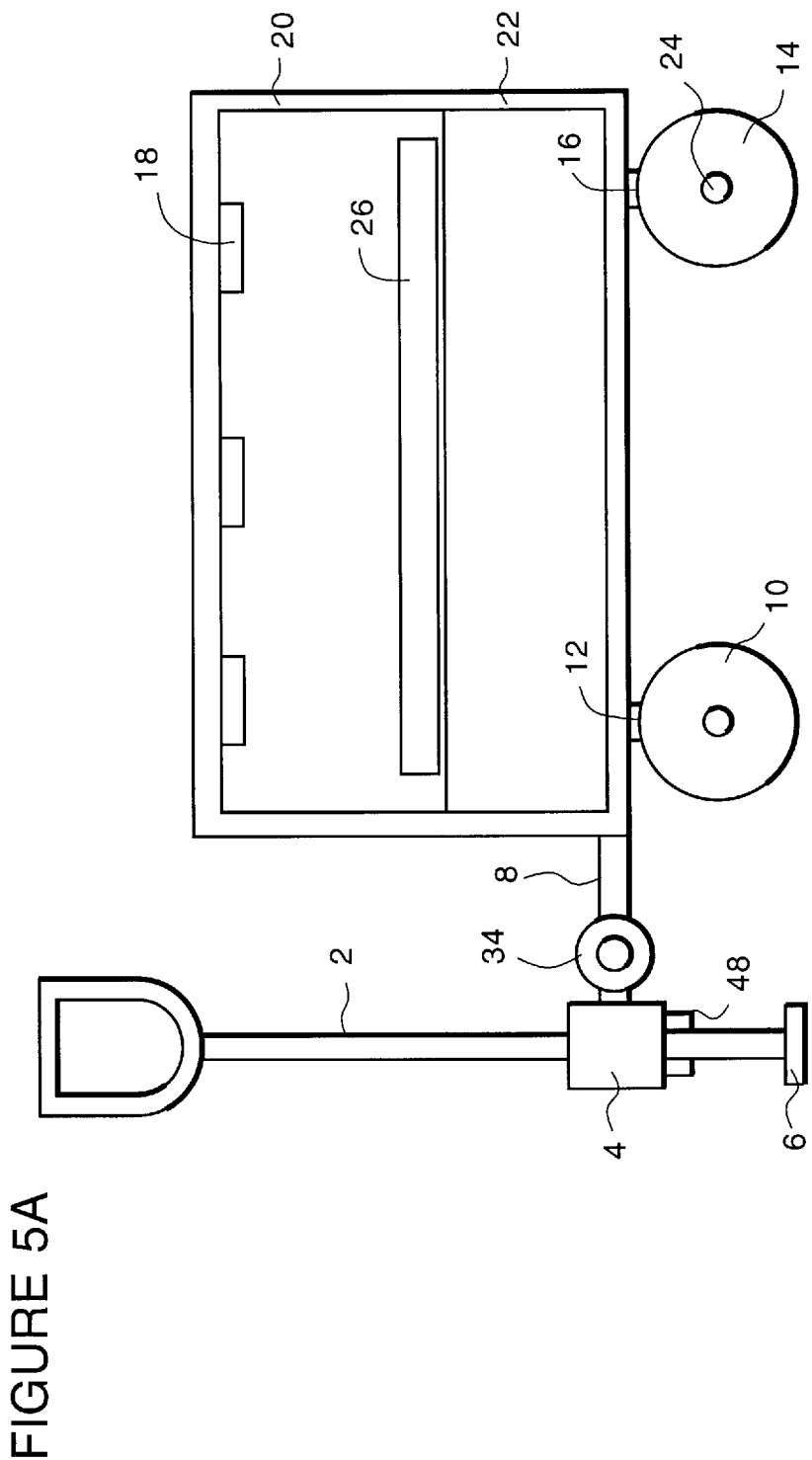
FIG. 5A to C are side views showing side views showing storage of the towing handle.
Figure 5B:
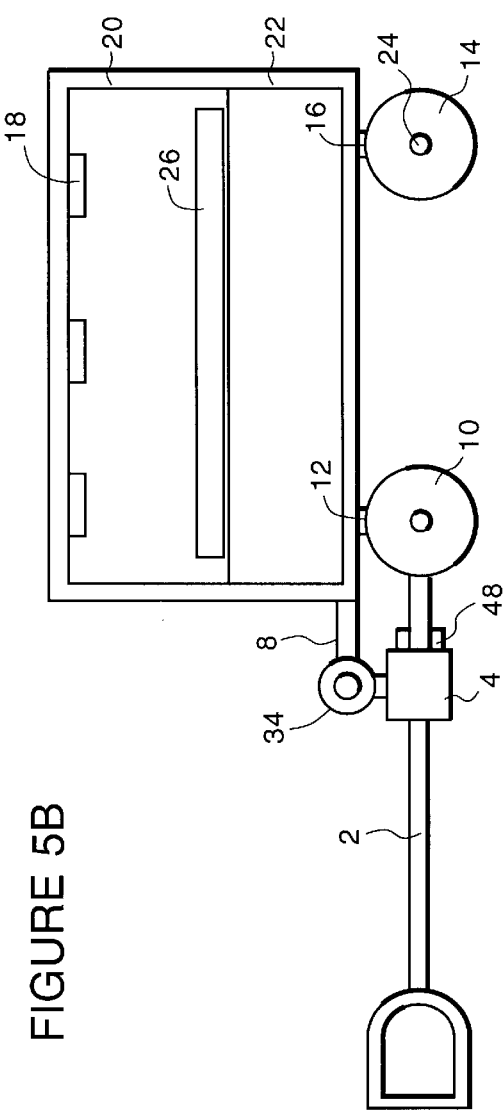
Figure 5C:
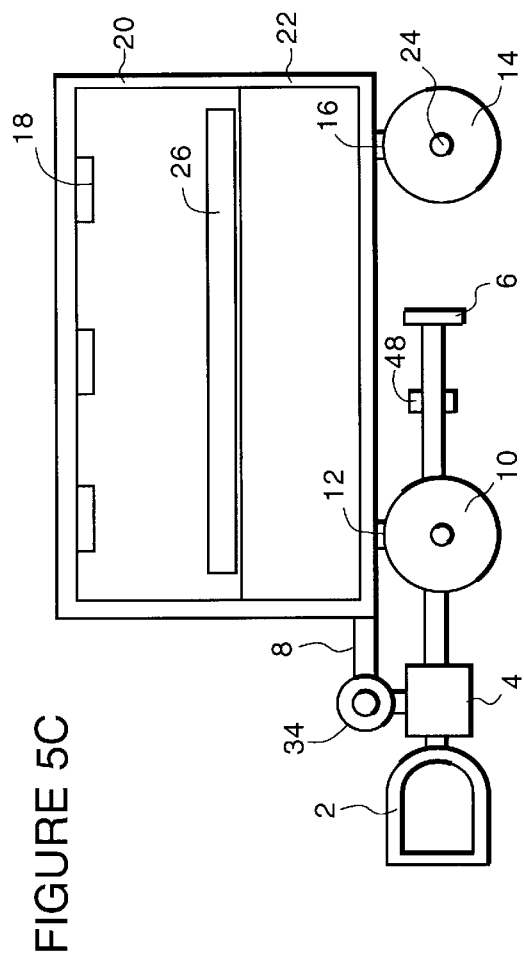

FIGS. 5A through 5C show the procedure for retracting the handle. The handle (2) is rotated, allowing the upper handle retainer (48) to slip downward through the handle sleeve (4). The handle (2) is then rotated about the pivot sleeve (34) and pushed horizontally through the sleeve (4) where it rests on one or both axles (36).

Figure 6:
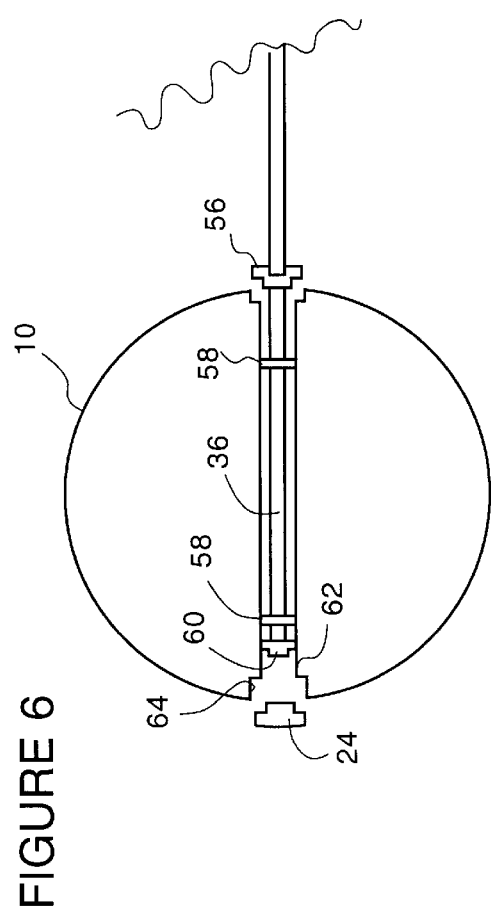
FIG. 6 is a cross sectional detail of the wheel and axle arrangement.

FIG. 6 is a detail of a wheel (10) and axle (36) assembly. The axle (36) passes through an inner wheel cap 56 and into a wheel sleeve (62) located in a hollow ball-shaped wheel (10). Lock washers (58) secure the axle in place and an axle hat (60) is placed over the end of the axle (36). An outer wheel cap (24) is seated into the sleeve indent (64) and sleeve (62). The axle hat (60) keeps the wheel (10) from sliding out and off the axle. Wheel caps (24, 56) and sleeve (62) arrangement prevent sand, water, and debris from entering the wheel (10), and provide additional security from accidentally lost wheels. It is preferable to have the sleeve (62) fit the axle assembly tightly so the axle (36) and wheel (10) turn as a unit. It is preferable the wheels be formed as a hollow plastic ball, however, other modifications such as providing a central slightly raised area on the ball to reduce friction on pavement can be incorporated.

Two prototypes were constructed, one used a rubberized wire grid for the upper portion and wheels obtained from Fisher Price TRIKE AND TRAILER toy. The other used a collapsible crate available under the trade name RUBBERMAID attached to a rear yoke with nuts and bolts. A rotatable wheel yoke was obtained from a toy wagon purchased at TOYS R US, and was attached to the box with nuts and bolts. Ball wheels from a RIDEM SHOE made by Empire Toys, N.C., were attached to an axle. A retractable handle was obtained from the toy wagon and attached to the crate.

The above assembled caddies was tested over a variety of surfaces including sand, grass, asphalt, and gravel. Testing has proven successful regarding transporting, weight stability, and maneuverability.

Figure 8:
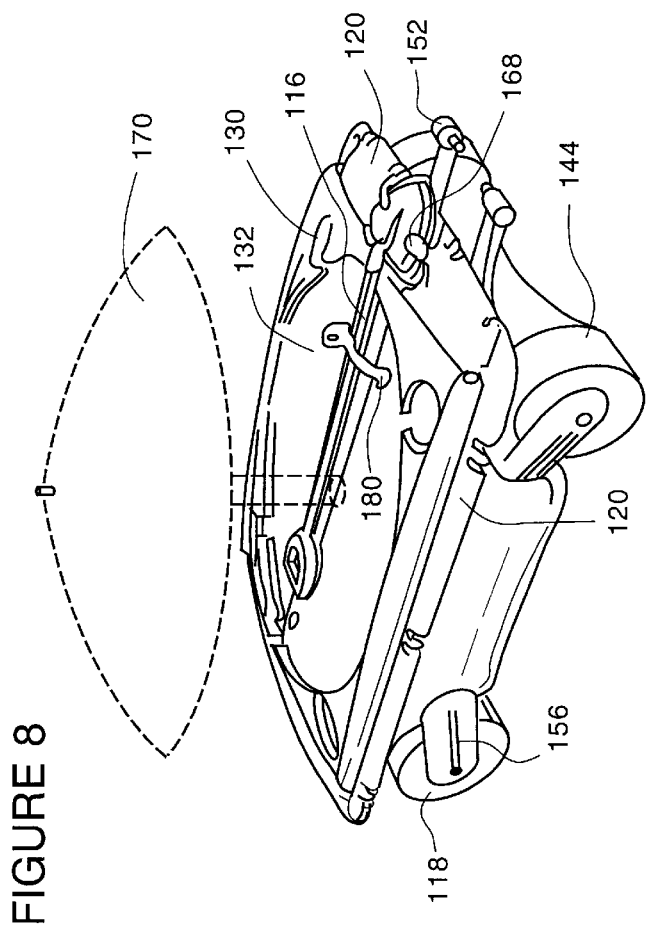
FIG. 8 is a perspective view of a cart of FIG. 7B folded.
Figure 9:
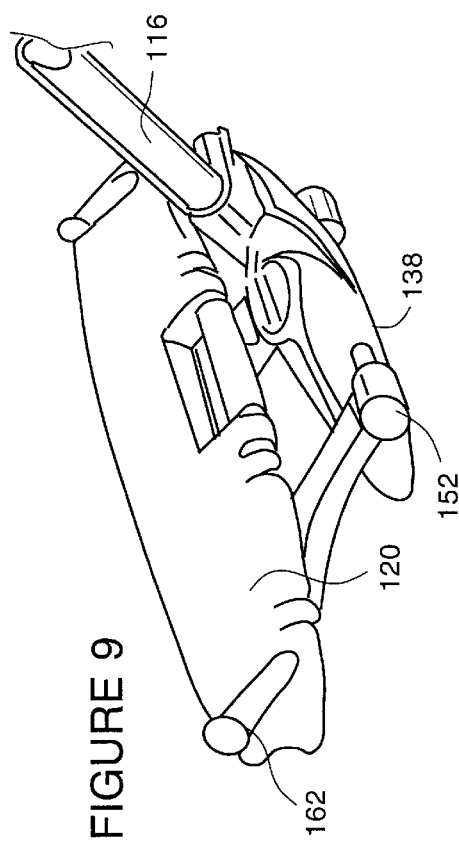
FIG. 9 is a perspective detail view of the handle arrangement of the cart of FIG. 7B.
Figure 10:
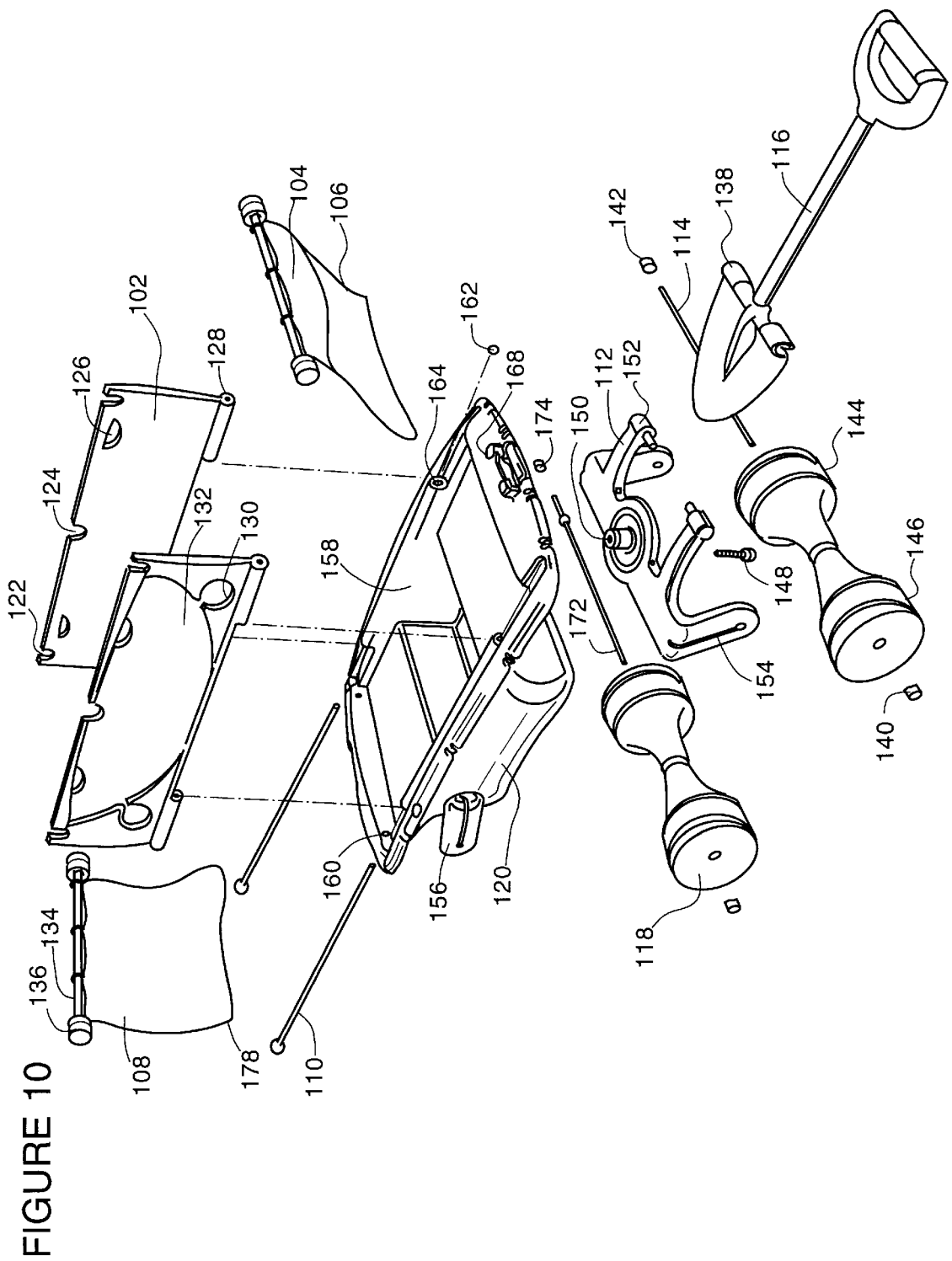
FIG. 10 is an exploded view of the cart of FIG. 7B.

The cart shown in FIGS. 7–10 has a molded body chassis 120. The tublike interior 158 of the chassis 120 is provided with seat like shelves, side bores 164, rear apertures 160, rear axle yoke 156, and handle retaining prongs 168. A steering yoke 112 is attached pivotally by a bolt 148 passing through an apertured projection 150 to an insert in the base of the chassis 120. The steering yoke 112 has an upper handle yoke 152 and a lower front wheel yoke 154. A shovel 116 having a hinge barrel connection 138 snaps onto hinge pins located on the upper handle yoke 152. The front wheel 144 has an elastic band ridge 146 and is held into the lower front wheel yoke 154 by an axle rod 114 having end caps 140, 142 which attach by pressing or threaded connections. The wheel 144 is preferably provided with an internal sleeve to prevent sand and water collection and to better distribute the weight of the cart. The rear wheel 118 is held into the rear axle yoke by an axle 172 and end caps 174. Table top side panels 102 are provided with end panel slots 122, attachment apertures 126, an umbrella notch 124, recessed table area 132 and a drink holder recess 130. The end panels 106, 108 are made of a soft material, preferably mesh, and therefore collapsible. At least one pocket 104 is provided. The panels 106, 108 have elastic sides and a grommeted aperture 178. The elastic sides help maintain the cross bar 134 tightly in the end panel slots 122. The cross bar 134 is provided with finials 136. Hinge pins 110 pass through the panel apertures side panel hinge barrels 128 and the chassis side bores 164 pivotally connect the side panels 102 to the chassis 120. End caps 162 are then located on the end of the hinge pins 110. When the cross bars 134 are removed, the side panels fold inward as shown in FIG. 8. The umbrella notches 124 can then be used to support an opened umbrella 170 for shade. To secure top in a folded state the shovel 116 can be placed under the handle retaining prongs 168. The panels 102 may further be secured by a lock 180 engaged through the attachment apertures 126. Alternatively the panels may be made with a built in lock. A hole in the chassis 120 located over the front steering yoke 112 and a line up socket in the front steering yoke having a pin connected to the lock so as to inhibit motion of the front steering yoke 112 would discourage theft.

Figure 11:
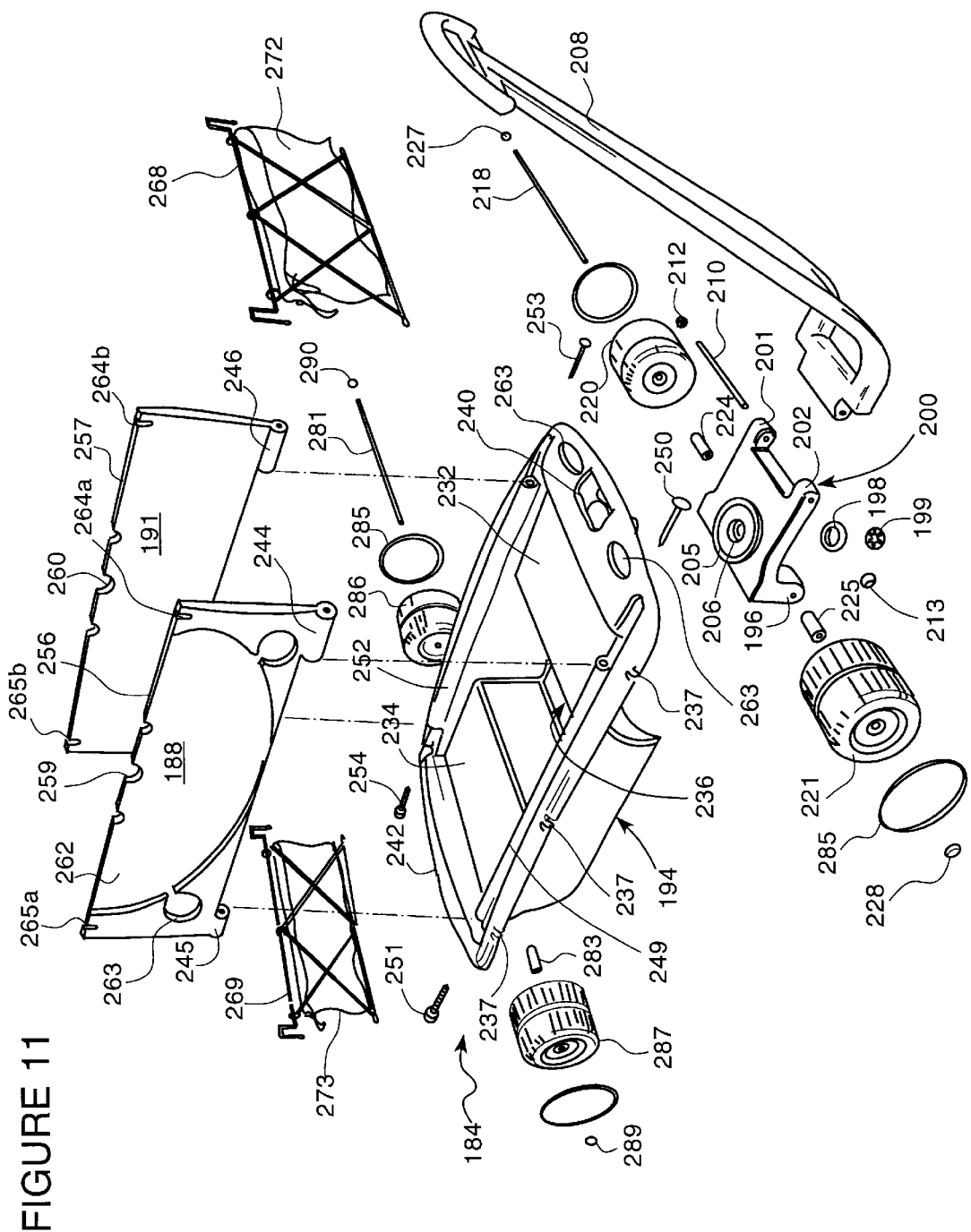
FIG. 11 is a top right side exploded perspective view of an alternative embodiment of the cart.

FIG. 11 shows an exploded view of an alternative embodiment of the cart 184. The cart 184 is comprised of several components including rectangular right side panel 188 and rectangular left side panel 191 and a multi-leveled base 194. Connected on a front end of the base 194 is a yoke 200 rotatably affixed to the underside of the base 194 on a boss 204. A handle 208 having a forward and rearward end is rotatably connected at the rearward end to the yoke 200 with a rotation means, in this embodiment a handle axle 210. The handle axle 210 is inserted through the yoke 200, tabs 201 and 202 and the handle 208 rearward end. A pair of retainers 212, 213 retain the axle 210, handle 208 and yoke 200 together. The retainers 212, 213 can be pressed or threaded onto the axle 210. The handle 208 is designed such that when it is rotated to lie on top of the right side panel 188 and left side panel 191 in the substantially horizontal position, the handle 208 does not increase significantly the overall height of the cart 184. This minimization of height is efficient from a storage and shipping point of view.

The base 194, right side panel 188, left side panel 191, yoke 200, handle 208 and wheels 220, 221, 286, 287 are molded from a polyethylene material.

The yoke 200 is L-shaped having tabs 201, 202 with holes, located near one end of the L for insertion of the axle 210 and connection to the handle 208. The tabs 196, 197 on the other end of the L are for insertion of the front axle 218 which connects to the front wheels 220, 221. The front axle 218 connects the front wheels 220, 221 and spacers 224, 225 and wheel connectors 227, 228 to the yoke 200. The axle 218 is preferably manufactured from carbon steel, but other materials could be utilized. The wheel connectors 227, 228 could be pressed or threaded to the axle 218.

On the top surface of the yoke 200 is a circular raised surface 205 circumscribing a rotation hole 206 which engages the boss 204.

The yoke 200 is attached to the base 194 when the boss 204 is inserted through the rotation hole 206 and restrained in this position.

This embodiment uses a washer 198 and retaining ring 199 to hold the yoke 200 against the base 194. Other methods of attachment could be used such as pins, nuts, adhesives etc.

The base 194 is rectangular shaped four sided and boxlike, having an open top, top surface, underside and interior. The interior has a planer front platform 232 and a planer rear platform 234 with an open section 236 at a different elevation than the front platform and rear platform 232, 234 for storage of various loose items when utilizing the cart 184. The front platform 232 and rear platform 234 can serve as storage platforms for transporting other items within the cart 184. The front platform 232 and rear platform 234 can also provide a rest for the right side panel 188 and left side panel 191 when they are in the closed position, FIG. 9.

The base 194 has a plurality of attachment tabs 237 around the periphery for engaging retention means such as ropes, cords, strings, nets, bungee cords and others, not shown. These retention means are used in restraining a large number of items or larger items in or on the cart 184. A front handle 240 and rear handle 242 are located near the outer periphery of the base 194 near the front and rear of the cart 184.

The front and rear handles 240, 242 can be used to lift the cart 184 either from or to an automobile or over curbs or anywhere the cart 184 could not normally roll.

The underside of the base 194 shows the boss 204 centrally located in a raised doughnut shaped structure 207 near the front of the cart 184. The raised doughnut shaped structure 207 corresponds in size and contacts the raised surface 205 of the yoke 200 when the base 194 and yoke 200 are assembled.

Figure 12:
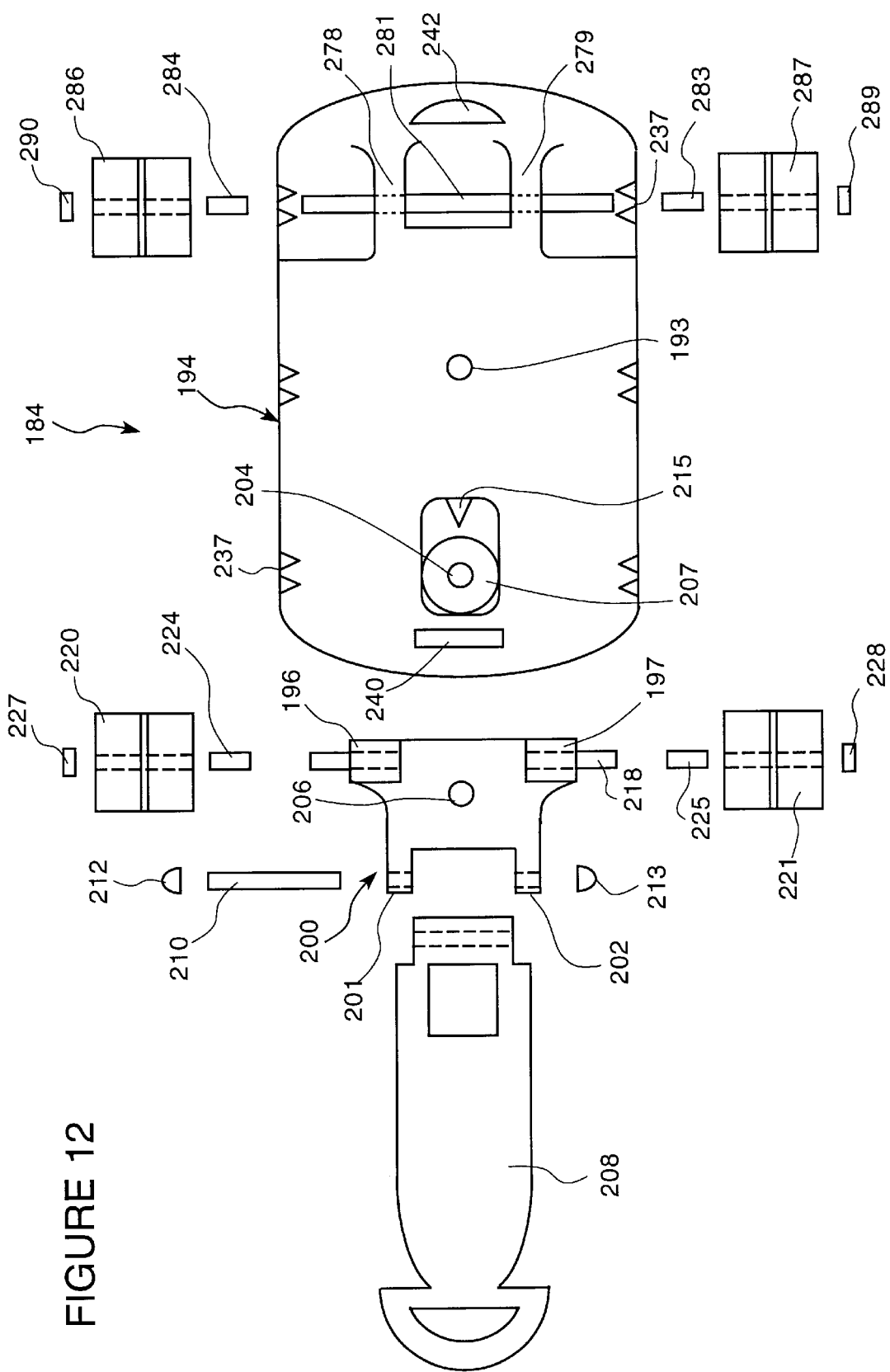
FIG. 12 is an exploded view of the bottom side of the cart in FIG. 11.

A stop tab 215, FIG. 12, is located between the boss 204 and umbrella hole 193. The stop tab 215 provides a stop for the front wheels 220, 221 when the yoke 200 is turned to the extreme. This prevents the wheels from turning beyond a critical point where the cart 184 may become more likely to tip over.

On the underside of the base 194 near the rear end are a pair of ridges 278, 279 with thru holes. A wheel axle 281 is inserted in the holes for mounting of spacers 283, 284 and rear wheels 286, 287. The rear wheels 286, 287 and spacers 283, 284 are restrained on the axle 281 with wheel connectors 289, 290 which can be pressed or threaded on. This embodiment shows the front wheels 220, 221 and rear wheels 286, 287 with a circumferential band 285 approximately centrally located across the width of the wheels.

Each side of the base 194 has an attachment means for rotatably attaching the right side panel 188 and left side panel 191 respectively. One embodiment shows panel tubes 244, 245 located on one edge of the right side panel 188. Panel tubes 246 and 247 (not shown) are located on one edge of the left side panel 191.

The panel tubes 244, 245 engage with the side pivot 249, when rotation pins 250 and 251 are inserted through panel tubes 244 and 245 respectively, engaging the side pivot 249. Other forms or rotation means could be utilized in various configurations to provide the rotation of the side panels 188, 191 relative to the base 194.

The left side panel 191 engages the side pivot 252 in like manner with rotation pins 253, 254 engaging panel tubes 246 and 247 and side pivot 252.

Once the side panels 188 and 191 are rotatably attached to the base 194, they can be rotated from a juxtaposed approximately horizontal closed position (FIG. 9) to an approximately 90 degree vertical position, FIG. 11.

The side panels 188, 191 each have a front cutout 264a, 264b and a rear cutout 265a, 265b respectively on a top edge 256, 257, or edge opposite the panel tubes 244, 245 and 246,247.

Top edge 256 also shows a semicircular cutout 259 located approximately midway along the edge, while top edge 257 shows a corresponding semicircular cutout 260. When the right side panel 188 and left side panel 191 are in the closed or in the approximately horizontal position, the semi circular cutouts, 259, 260 form a circular hole which is directly over the umbrella hole 193, FIG. 13. This allows an umbrella pole, or flag pole (not shown) to be inserted through the base 194 into the sand or onto the ground to help restrain the umbrella from gusty winds while providing shade to the users and users belongings. The umbrella hole 193 can also be used as a drainage hole for dirt, sand or water that may accumulate in the base 194 or to drain water used to rinse or wash the cart 184.

On either side of the semicircular cutouts 259, 260 can be located additional cutouts to aid in grasping the side panels 188,191 in rotating them from the approximately horizontal to the approximately the vertical position.

When the side panels 188 and 191 are in the approximately horizontal position, a depressed circular table portion 262 is formed. The side panels 188, 191 can also have a plurality of drink recesses 263, this embodiment shows two on each side panel 188, 191. Obviously more or fewer drink recesses 263 could be shown and the location could be modified. This embodiment also shows a pair of drink recesses 263 near the front end of the base 194 on either side of the front handle 240.

When the side panels 188, 191 are in the approximately vertical position, they can be restrained in that position with a pair of wire forms 268, 269. The wire forms 268, 269 have three sided rectangular ends for engaging and hooking around and over the side panels 188, 191. The rectangular ends of wire form 268 engage the front cutout 264a and 264b of side panels 188, 191 while the rectangular ends of wire form 269 engage the rear cutouts 265a, 265b of side panels 188, 191. The wire forms 268, 269 retain the side panels 188, 191 in the approximately vertical position and function to constrain objects or small persons in the carrying space formed by the side panels 188, 191, wire forms 268,269, front and rear platform 232, 234 and open section 236.

Wire forms 268, 269 each have a storage bag 272, 273 respectively. This embodiment shows the storage bags 272, 273 manufactured from a mesh material having a cord closure on a top opening. The storage bags 272, 273 are attached to the wire forms 268, 269 with an attachment means, in this embodiment rings.

It will now be apparent to those skilled in the art that other embodiments, improvements, details and uses can be made consistent with the letter and spirit of the foregoing disclosure and within the scope of this patent, which is limited only by the following claims, construed in accordance with the patent law, including the doctrine of equivalents.

While the above described caddies present a preferred embodiment, other adaptations are possible. For example, since the wheels are buoyant, a cart could be adapted for unloading small craft such as a canoe for lunch on the shore.

What is claimed is:

1. A wheeled cart comprising:
   a boxlike base having a front and a rear end and a left and a right side,
   the base connected to a pair of rotatable left and right side panels wherein the left and right side panels fold toward one another to a substantially horizontal position to form a table,
   the left and right side panels each having a corresponding semi-circular cutout on respective top edges, a pair of cross bars for interconnecting the left and right side panels and maintaining the side panels in an approximate vertical position, a rotatable yoke for attachment to a base bottom surface near the front end, a pair of front wheels and a handle attached to the yoke, said yoke rotatable relative to the base to provide a steering effect to the base, and a pair of rear wheels attached to the base bottom surface near the rear end.

2. The wheeled cart of claim 1 wherein:

the handle folds onto the left and right side panels in the substantially horizontal position.

3. The wheeled cart of claim 1 further comprising:

an umbrella hole located in an open section and in approximate vertical alignment with the semicircular cutouts of the left and right side panels when in the substantially horizontal position, and the umbrella hole and cutouts for insertion and retention of a pole or umbrella.

4. The wheeled cart of claim 1 further comprising:

a plurality of attachment tabs around the periphery of the base for the engagement of a means for retaining objects to the cart.

5. The wheeled cart of claim 1 further comprising:

at least one storage bag for attachment to each cross bar, each storage bag having a pocket.

6. The wheeled cart of claim 1 further comprising:

a front handle near the front end of the base and a rear handle near the rear end of the base for lifting the cart.

7. The wheeled cart of claim 1 further comprising:

a horizontal front platform located between the side panels near the front end, and a horizontal rear platform located between the side panels near the rear end.

8. A wheeled cart comprising:

a base having a top surface with a front platform located near a front end and a rear platform located near a rear end, a depressed open section for the storage and transport of articles, the open section located between the front platform and rear platform;

a hinged right side panel and a hinged left side panel rotatably attached to each side of the base for rotation from a juxtaposed substantially horizontal position to a substantially vertical position, a pair of cross bars for interconnection between the right side panel and the left side panel to maintain the panels in the substantially vertical position, a storage bag removably attached to each respective cross bar for the storage of articles, an L-shaped yoke with a central rotation hole for attachment to a boss, the boss located on a bottom surface of the base, a pair of tabs located on each end of the L-shaped yoke, one pair of tabs for engagement with a front axle and the second pair of tabs for engagement with a handle axle, a pair of front wheels rotatably attached to the front axle, a handle rotatably attached to the handle axle, the handle for steering the cart; and a pair of ridges extending from a bottom surface of the base near the rear end, the ridges having holes for insertion of a wheel axle, a pair of rear wheels for mounting on the wheel axle, the wheel axle and rear wheels restrained by a pair of wheel connectors.

9. The wheeled cart of claim 8 wherein:

the handle folds onto the left and right side panels in the substantially horizontal position.

10. The wheeled cart of claim 8 further comprising:

an umbrella hole located in the open section and in approximate vertical alignment with a semicircular cutout on each of the left and right side panels when the side panels are rotated to the substantially horizontal position, the umbrella hole and cutouts for insertion of a pole.

11. The wheeled cart of claim 8 further comprising:

a plurality of attachment tabs around the periphery of the base for the engagement of a means for retaining objects to the cart.

12. The wheeled cart of claim 8 wherein:

at least one storage bag for attachment to each cross bar, each storage bag having a pocket.

13. The wheeled cart of claim 8 further comprising:

a front handle near the front end of the base and a rear handle near the rear end of the base for lifting the cart.

14. A wheeled cart comprising:

a rectangular shaped base having a front end and a rear end, an underside and a top surface with a front handle centrally located on the front end and a rear handle centrally located on the rear end, a pair of drink recesses one on each side of the front handle, a side pivot on a left side of the base and corresponding side pivot on a right side of the base, a front platform located near the front end between the side pivots, an open section located between the front platform and the rear end for carrying and storage of items, a rear platform located between the open section and the rear end;

a boss on the underside of the base near the front end with a circumscribing raised doughnut shaped structure where the boss is inserted into a rotation hole on an L-shaped yoke, the L-shaped yoke having a pair of tabs on one end for attachment of a handle and a second pair of tabs on the opposite end of the yoke for attachment of a pair of front wheels, the yoke rotatable relative to the base around the boss;

a stop tab located rearward from the boss for preventing rotation of the yoke beyond a predetermined angle, a pair of ridges on the underside of the base for engaging a wheel axle on which are mounted a pair of rear wheels, a left side rectangular panel and a right side rectangular panel each having a semicircular cutout and a front and rear cutout on respective top edges, a pair of panel tubes on each of the panels, the panel tubes for attachment to the respective side pivots where the side panels are rotatable from a juxtaposed substantially horizontal position to a substantially vertical position, the side panels when in the substantially horizontal position forming a recessed table portion having a plurality of drink recesses surrounding the table portion, and the semicircular cutouts, when the panels are in the substantially horizontal position, forming a circular hole centered in the table portion approximately over an umbrella hole in the base;

a pair of cross bars for engagement between each of the respective right and left side panel front and rear cutouts, the cross bars for maintaining the side panels in a substantially vertical position forming an interior for the transport of materials there within; and a storage bag affixed to each of the cross bars for the retention of articles.

15. The wheeled cart of claim 14 wherein:

the handle folds onto the left and right side panels in the substantially horizontal position.

16. The wheeled cart of claim 14 wherein:

the umbrella hole and semicircular cutouts of the left and right side panels for insertion and retention of a pole.

17. The wheeled cart of claim 14 further comprising:

a plurality of attachment tabs around the periphery of the base for the engagement of a means for retaining objects to the cart.

18. The wheeled cart of claim 14 wherein:

the storage bags each having a pocket.

* * * * *